March 10, 1936.  C. J. HUGHEY  2,033,713
INDICATING SYSTEM FOR ROLLS OF STRIP MATERIAL
Filed April 15, 1933    2 Sheets-Sheet 1

Inventor:
Carter J. Hughey,

March 10, 1936.  C. J. HUGHEY  2,033,713
INDICATING SYSTEM FOR ROLLS OF STRIP MATERIAL
Filed April 15, 1933  2 Sheets-Sheet 2

Inventor:
Carter J. Hughey,
By Newton M. Purvis
George A. Gillette, Jr.
Attorneys.

Patented Mar. 10, 1936

2,033,713

UNITED STATES PATENT OFFICE 2,033,713

INDICATING SYSTEM FOR ROLLS OF STRIP MATERIAL

Carter J. Hughey, Rochester, N. Y., assignor to Eastman Kodak Company, Rochester, N. Y., a corporation of New York Application April 15, 1933, Serial No. 666,319

12 Claims. (Cl. 33—172)

The present invention relates to an indicating system for rolls of strip material, and more particularly to an indicator for signifying the amount of strip material on any one of several rolls.

Indicating systems which signify directly the number of feet of strip material on a particular roll are well known. Indicating systems which emit an audible or visible signal when the amount of strip material on a roll reaches a predetermined value are also well known. However, in all previous systems an individual indicating device is employed to signify the amount of material on each individual roll.

In many arrangements, such as a duplex camera, accurate determination of the amount of strip material on each and every roll at all times is not necessary. The most important information desired as to the footage on the various rolls can be measured in terms of the diameter of the smallest or largest roll. In other words, if the supply of strip material is being measured as the rolls are reducing in diameter, it is, in general, only necessary to know the amount of strip material remaining on the roll of smallest diameter. Conversely, if the rolls are building up, it is only necessary to note the diameter of the largest roll. Information as to the other rolls of a system is convenient but not necessary, and greatly increases the complication and cost of the indicating system.

The primary object of the present invention is the provision in an indicating system for a plurality of rolls of an indicating means for signifying the amount of strip material on one of said rolls, which roll is either of the greatest or smallest diameter.

Another object of the present invention is the provision in an indicating system for a plurality of rolls of strip material of a footage indicator for registering directly the amount of strip material on one of said rolls.

A further object of the present invention is the provision in an indicating system for a plurality of rolls of strip material, of a single indicating means for emitting an audible or visible signal as the amount of strip material on one of said rolls increases or decreases to a predetermined value.

Still another object of the present invention is the provision in an indicating system for a plurality of rolls of strip material, of a graduated indicator, and a plurality of members which are adapted to engage the outer convolution of respective rolls, the member which supervises the position of the indicator being that one which is in contact with the largest or smallest roll.

Other objects of the invention will be suggested to those skilled in the art as the disclosure of the invention proceeds.

The aforementioned objects of the invention are attained by the provision of a plurality of members for engaging the outer convolutions of a plurality of film rolls, and a single indicating means which may be operated by any one of said members but which is directly controlled or supervised by the member in engagement with the largest or smallest roll. The indicating means may also include a pair of contacts which are moved relatively with respect to each other by one of the members to assume positions corresponding to the diameter of the largest or smallest roll of material, said contacts being adapted to control the emission of a visible or audible signal as the diameter of the engaged roll reaches a predetermined value.

The principles of the present invention are applicable to any indicating system for a plurality of film rolls, but the invention is disclosed with respect to a pair of film rolls in a duplex camera. It is to be understood that this disclosure is not limited to a camera construction or to a pair of film rolls because my indicating system could be readily adapted to other uses and to indicate the diameter of the largest or smallest roll out of several rolls.

Reference is made to the accompanying drawings which are only illustrative of the present invention, and in which similar reference characters designate similar elements:

Figure 1:
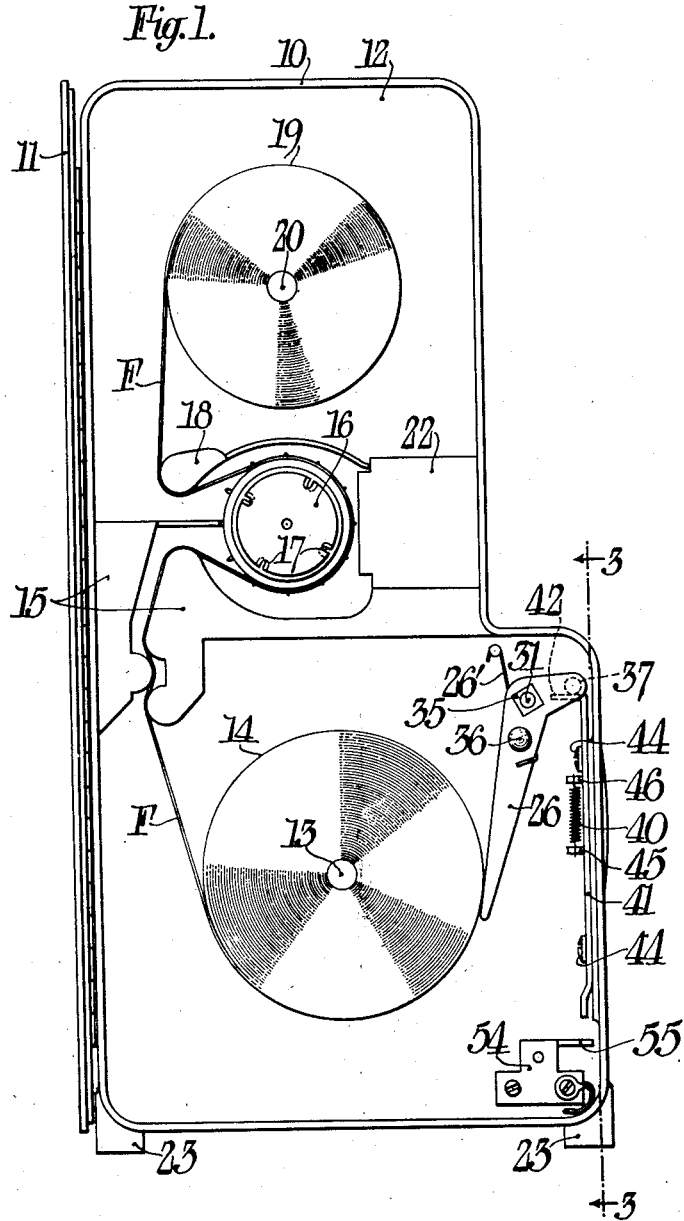
Fig. 1 is a side elevation of a duplex camera with one cover in open position to more clearly show the internal parts of the camera.
Figure 2:
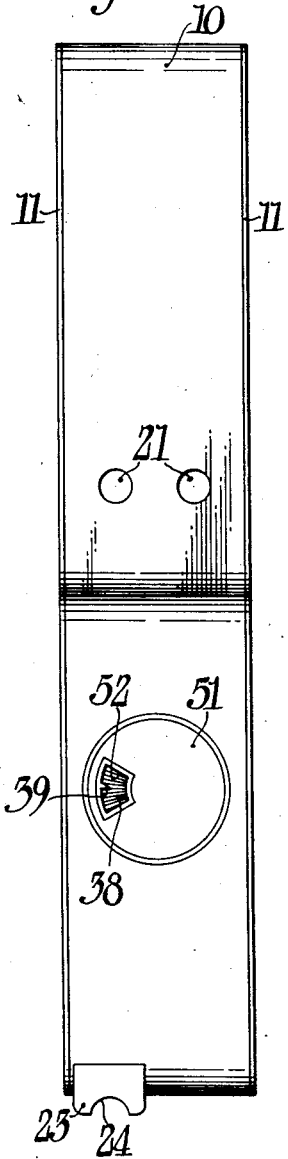
Fig. 2 is a front elevation of a duplex camera with both covers in closed position and showing the single footage indicator on the front wall of the camera.
Figure 3:
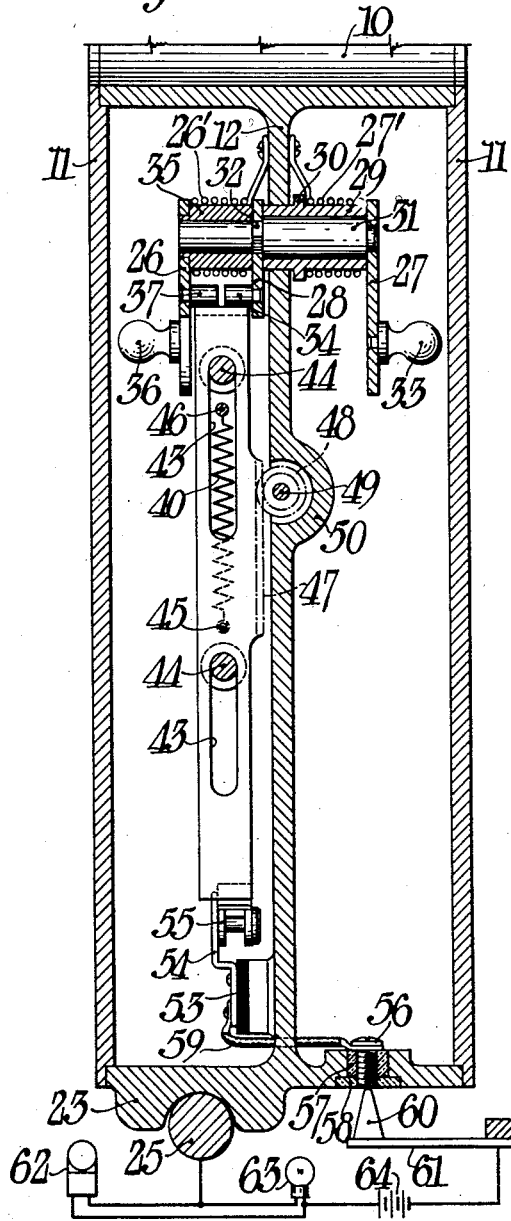
Fig. 3 is a vertical cross-section to an enlarged scale taken on the line 3—3 of Fig. 1, and diagrammatically illustrates the electrical circuits for the audible and visible signals.

In the illustrated embodiment of the invention, the camera casing 10 has a pair of covers 11 hinged to each side of casing 10, and a central partition 12 extending vertically through the casing and dividing the same into a pair of film compartments. The path of the film F will only be described with respect to one side of the camera, inasmuch as the other side of the camera is identical with respect to film handling. A spindle 13 supports a supply film roll 14 in the lower part of each film compartment. A pair of guide members 15 is centrally located in each compartment and conducts the film F from the supply film roll 14 to the periphery of a sprocket 16 which is rotatably mounted and provided with a plurality of notches 17 for engagement with a driving means (not shown). The film F is conducted from sprocket 16 to a take-up film roll 18 by means of a guide shoe 19. The take-up film roll is mounted for rotation in a known manner upon a take-up spindle 20.

A pair of objectives 21 is located in respective objective blocks 22 within each film compartment with each objective in proper physical and optical relation with respect to the film encircling the periphery of sprocket 16.

Two lugs 23 are located at the lower corners of casing 10 and are provided with grooves 24 which are adapted to engage a rod 25 for the support of the camera.

The construction thus far described does not constitute any part of the present invention, but merely provides a setting for the invention, as it illustrates a practical use of a plurality of rolls of strip material which are to be measured.

A plurality of members are mounted in a position to make contact with the outer convolution of each film roll, and are independently movable to assume positions corresponding to the diameter of the respective roll. Arms 26 and 27, 28 of the present embodiment constitute such independently movable members. The member including arms 27 and 28 is rotatably mounted on central partition 12 by means of a sleeve 29 having a collar 30 and supported in partition 12. A shaft 31 extends through sleeve 29, is attached at one end to arm 27, and has a square portion 32 for engaging and supporting the arm 28. A knob 33 is fastened to arm 27 to facilitate manual movement thereof, and a pin 34 is fastened to arm 28 for a purpose to be later described. The other of said members is composed of arm 26 which is driven onto the square end of a sleeve 35. The sleeve 35 is rotatably mounted on the other end of shaft 31 and is independently movable of that supporting shaft. A knob 36 and a pin 37 are also attached to arm 26.

A coil spring 26' encircles sleeve 35, has one end attached to partition 12, and the other end curved around arm 26 to bias the same in a clockwise direction, see Fig. 1. A second coil spring 27' encircles sleeve 29, has one end attached to partition 12, and the other end bent around arm 27 to bias that arm in a clockwise direction, as viewed from Fig. 1. Springs 26' and 27' act to independently move the respective arms 26 and 27 against the outer convolution of the adjacent film roll.

A single footage indicating means is operated by a single one of said members to directly indicate the feet of material on the roll with which the member is contacting. This single footage indicating means is illustrated as including a slidable element, a dial 38, a pointer 39, and a coil spring 40. The slidable element is composed of a bar 41 having a right-angled end 42, and provided with elongated slots 43. A pair of headed pins 44 are threaded into the front wall of casing 10, and slidably engage slots 43 of bar 41 to slidably support said bar or slidable element on the casing. The coil spring 40 is connected at one end to a pin 45 located on bar 41, and at the other end to a pin 46 in the front wall of casing 10 and located within one of the slots 43. By the construction just described, the slidable element is normally held with the end 42 against either or both of pins 34 and 37 on arms 28 and 26 respectively. The end 42 of bar 41 will engage only one of the pins 34 and 37 if the film rolls are of unequal diameter. For instance, if arm 27 is in engagement with a film roll of larger diameter, the pin 34 will be held above the end 42 of bar 41. Coil springs 26' and 27' are both stronger and predominate over the resilient action of coil spring 40. In other words, arms 26 and 27 are held against the respective film rolls by springs 26' and 27', while the coil spring 40 raises the bar 41 to engage either pin 34 or pin 37. The resilient action of coil spring 40 will also tend to move either arm 26 or arm 27 away from the film roll, but is not permitted to cause such movement because of the predominance of coil springs 26' and 27'. A rack 47 is provided along one edge of bar 41 and engages a pinion 48 which is attached to a shaft 49. The shaft 49 is rotatably mounted within an enlarged portion 50 of central partition 12, and supports on one end the dial 38 which is provided with a plurality of calibrated graduations. A convex plate 51 is mounted on the front wall of casing 10, covers dial 38, and is provided with an aperture 52 into which the pointer 39 extends for registration with the graduations on dial 38.

The operation of the single footage indicator to register directly the amount of film on the smaller film roll should now be apparent. The slidable element or bar 41 will assume positions corresponding to the diameter of the smaller film roll, this positioning of the slidable element will be effected either through the assembly composed of arm 27, shaft 31, arm 28, and pin 34, or the assembly composed of sleeve 35, arm 26, and pin 37. As the diameters of the film rolls decrease, see Fig. 1, the arm 26 and the arm 27 will be moved under the action of coil springs 26' and 27' to make frictional engagement at all times with the outer convolutions of the respective film rolls. The slidable element will be raised under the action of coil spring 40 so that end 42 of bar 41 is merely held against the lower pin on the arm which is in contact with the smaller film roll. This elevation of the slidable element will cause rotation of the dial 38 and move the graduations thereon with respect to the pointer 39 so that the number of feet of film remaining on the smaller film roll will at all times be registered opposite pointer 39. The other pin will be held above the end 42 of bar 41 if its corresponding film roll is of greater diameter, both pins making contact with the end 42 only if the film rolls are of equal diameter.

Since it may be convenient to locate the footage indicator at a point which cannot be readily observed by an operator, it is often desirable to supplement the direct footage indications with audible and visible signals. It is not practical to design such audible and visible signals for direct indication of the film footage, and consequently these signals are employed to signify only a definite or predetermined value of the film on the roll. The audible and visible indicating means both include the slidable element of the previously mentioned footage indicator. This element is movable to positions corresponding to the diameter of the smaller film roll, and comprises one of a pair of contacts which controls the signals.

An insulating block 53 is mounted on partition 12 and supports an angle member 54. A contact member 55 is rotatably mounted on angle member 54, and makes direct contact with one end of the slidable element or bar 41. This contact member 55 is rotatably mounted to permit over travel or continued movement of the slidable element after contact is made, without danger of causing damage to the indicating means. A conducting stud 56 is imbedded in one wall of casing 10 within an insulating sleeve 57 and insulating washer 58. A wire 59 is connected between stud 56 and angle member 54. A pointed contact 60 is mounted on a leaf-spring 61, and is adapted to make contact with stud 56 when the camera is located in operating position and supported by rod 25. An audible signal, such as a buzzer 62, and a visible signal, such as an incandescent lamp 63, are connected in parallel and between rod 25 and spring 61, being energized by a battery 64. The circuit for either of these signals upon contact between contact member 55 and the end of bar 41 can be traced as follows: From battery 64 through leaf-spring 61, pointed contact 60, conducting stud 56, wire 59, angle member 54, bar 41, and headed pins 44 to the casing 10 of the camera from whence the circuit is continued through rod 25, and either or both buzzer 62 and lamp 63 to the battery 64. The exterior of casing 10 may be painted or lacquered, but the surfaces of grooves 24 should be left bare for good electrical contact between the casing 10 and the rod 25.

The audible and visible signals will be inoperative most of the time, but when the diameter of either film roll has been reduced to a predetermined value, contact is made between one end of bar 41 and contact member 55. This predetermined value may be varied by changing the location of block 53, but is generally selected as the location so that contact is made when all of the film has been removed from the supply film roll.

The term "duplex" camera as used throughout the specification and in some of the claims is intended to define a camera in which photographic images may be formed simultaneously or otherwise upon two parallel film strips. Fritts Patent 1,730,930 discloses one type of "duplex" camera. However, for the purposes of the present invention, it is not necessary that the parallel films be exposed to the same object or that the film rolls be moved simultaneously. In other words, a duplex camera may include parallel film strips upon which dissimilar objects are photographed and which may be moved alternatively. It is also pointed out that the features of the invention apply with equal advantage to other types of film handling apparatus, the only requirements being that a plurality of rolls arranged to be wound or unwound cooperate with a single indicating means which is controlled by the roll either of least or greatest diameter.

Many alterations or modifications of the present invention will readily occur to those skilled in the art, and the scope of the invention is to be construed in accordance with the appended claims.

Having now particularly described my invention, what I desire to secure by Letters Patent of the United States and what I claim is:

1. In an indicating system for a plurality of rolls of strip material, the combination with a plurality of members each independently movable into a position corresponding to the diameter of the respective roll, of a single indicating means for signifying the amount of strip material on any one of said rolls operable by any one of said members, and operated by the member in contact with the roll of least diameter.

2. In an indicating system, the combination with a casing adapted to contain a plurality of rolls of strip material, a plurality of members each independently movable within said casing into a position corresponding to the diameter of the respective roll, of a single footage indicating means on said casing for registering the amount of strip material on either one of said rolls operable by any one of said members, and operated only by the member in contact with the roll of least diameter.

3. In an indicating system for a plurality of rolls of strip material, the combination with a plurality of members each independently movable into a position corresponding to the diameter of the respective roll, of a single indicating means including elements operatively connected with said members so as to be movable to positions corresponding to the positions assumed by any of said members, but operated only by the member in contact with the roll of least diameter and for emitting a signal upon movement of said elements to a predetermined position thereby signifying that the amount of strip material on one of said rolls has reached a predetermined value.

4. In an indicating system for a plurality of rolls of strip material, the combination with a plurality of members movably mounted, adapted to engage the outer convolution of the respective rolls and independently to assume positions corresponding to the diameters of said respective rolls, of a single indicating means movable to positions corresponding to the positions of any one of said members and operatively connected with said members so as to be controlled by the member in engagement with the roll of least diameter.

5. In an indicating system for a plurality of rolls of strip material, the combination with a plurality of members movably mounted, adapted to engage the outer convolution of the respective rolls and independently to assume positions corresponding to the diameters of said respective rolls, of a single footage indicating means which is movable to positions corresponding to the positions of any one of said members, which is operatively connected with said members so as to be controlled by the member in contact with the roll of least diameter and which is adapted to register the amount of strip material on said roll of least diameter.

6. In an indicating system for a plurality of rolls of strip material, the combination with a plurality of members movably mounted, adapted to engage the outer convolution of the respective rolls and independently to assume positions corresponding to the diameters of said respective rolls, of a single indicating means operatively connected to each member so as to be operable thereby but operated by the one member in contact with the roll of least diameter and including a slidable element and a spring for holding said element against the one of said members which is in engagement with the outer convolution of the roll of least diameter.

7. In a duplex camera containing a pair of film rolls, the combination with a pair of members independently movable and adapted respectively to engage the outer convolutions of said film rolls, of a single electrical indicating means including a single pair of contacts which are relatively movable and operatively connected with said members so as to be controlled by either one of said members and so as to be closed by the member in engagement with the roll of lesser diameter and including a signal which is adapted to be operated when said pair of contacts are closed.

8. In a duplex camera containing a pair of film rolls, the combination with a pair of members independently movable and adapted to engage the outer convolutions of said film rolls to assume positions corresponding to the diameters thereof, of a single electrical indicating means including a single pair of contacts which are operatively connected with said members so as to be movable by either one of said members into relative positions corresponding to the diameter of the smaller film roll and including a signal which is adapted to be operated when said pair of contacts are closed by movement of the member in engagement with the smaller film roll into a predetermined position.

9. In a duplex camera containing a pair of film rolls, the combination with a casing having side walls and a partition dividing said casing into two compartments for respective film rolls, and a pair of arms independently rotatable on said partition and biased respectively to engage the outer convolution of the film roll in each compartment, of a single indicating means including a dial and a pointer movable with respect to each other to indicate film footage and including an element slidably mounted on said casing for relatively moving said dial and pointer and adapted to be located by the arm in engagement with the film roll of smaller diameter.

10. In a duplex camera containing a pair of film rolls, the combination with a casing having side walls and a partition dividing said casing into two compartments for respective film rolls, and a pair of arms independently rotatable on said partition and biased respectively to engage the outer convolution of the film roll in each compartment, of a single indicating means including a dial and a pointer one of which is rotatably mounted in said casing for relative movement therebetween to indicate film footage, an element slidably mounted on said casing for relatively moving said dial and pointer, and a spring between said element and said casing for holding said element against the one of said arms which is in engagement with the outer convolution of the smaller film roll.

11. In a duplex camera containing a pair of film rolls, the combination with a casing having side walls and a partition for forming two film compartments for respective film rolls, and a pair of arms independently rotatable on said partition and adapted respectively to engage the outer convolution of the film roll in each compartment, of a single indicating means including a pointer on said casing, a dial rotatably mounted in said casing and having graduations for registry with said pointer to indicate film footage, an element mounted on said casing for rectilinear movement and engaging said dial to rotate the same, and a spring between said element and said casing for holding said element against the one of said arms which is in engagement with the outer convolution of the smaller film roll.

12. In a duplex camera containing a pair of film rolls, the combination with a casing having side walls and a partition for forming two film compartments for respective film rolls, and a pair of arms independently rotatable on said partition and adapted respectively to engage the outer convolution of the film roll in each compartment, of a single indicating means including a pointer on said casing, a dial rotatably mounted in said casing and having a gear attached thereto and graduations thereon for registry with said pointer to indicate film footage, an element having a pin and slot connection with said casing and having a rack for engaging said gear, and a spring between said element and said casing for holding said element against the one of said arms which is in engagement with the outer convolution of the smaller film roll.

CARTER J. HUGHEY.